United States Patent [19]

Link et al.

[11] 4,339,181

[45] Jul. 13, 1982

[54] LENS ARRANGEMENTS FOR MICROFICHE READER ASSEMBLY AND METHOD

[75] Inventors: William T. Link, Berkeley; Stephen Hobson, Santa Clara, both of Calif.

[73] Assignee: Datagraphix, Inc., San Diego, Calif.

[21] Appl. No.: 127,230

[22] Filed: Mar. 4, 1980

[51] Int. Cl.³ .................. G03B 21/14; G03B 3/00
[52] U.S. Cl. ................... 353/27 R; 353/101
[58] Field of Search ............ 353/101, 100, 26 R, 353/26 A, 25, 27 R, 27 A; 350/255, 254, 252

[56] References Cited

U.S. PATENT DOCUMENTS

| | | | |
|---|---|---|---|
| 3,809,460 | 5/1974 | Lettan et al. | 353/39 X |
| 3,811,763 | 5/1974 | Cordonnier | 353/77 |
| 4,050,799 | 9/1977 | Gross et al. | 353/101 X |
| 4,067,648 | 1/1978 | Spreitzer | 350/254 X |
| 4,119,372 | 10/1978 | Morgan | 353/101 X |
| 4,170,408 | 10/1979 | Behr | 353/72 |
| 4,215,915 | 8/1980 | Freiberg | 353/101 X |

Primary Examiner—Harry N. Haroian
Attorney, Agent, or Firm—Flehr, Hohbach, Test, Albritton & Herbert

[57] ABSTRACT

A microfiche reader is disclosed herein and includes an assembly for supporting a microfiche in a given area, a projection screen and an optical arrangement for providing an image of a segment of the microfiche on the screen. This arrangement utilizes a dual projection lens assembly and a dual condenser lens assembly which cooperate with one another so that the magnification of the projected image can be easily varied between two levels. As disclosed, the dual projection lens assembly itself includes two distinct projection lenses which are contained in collapsible housings. Moreover, each of these latter lenses is adjustably focused by rotational movement of its associated housing and remains in the focusing position selected unless its housing is again rotated.

11 Claims, 9 Drawing Figures

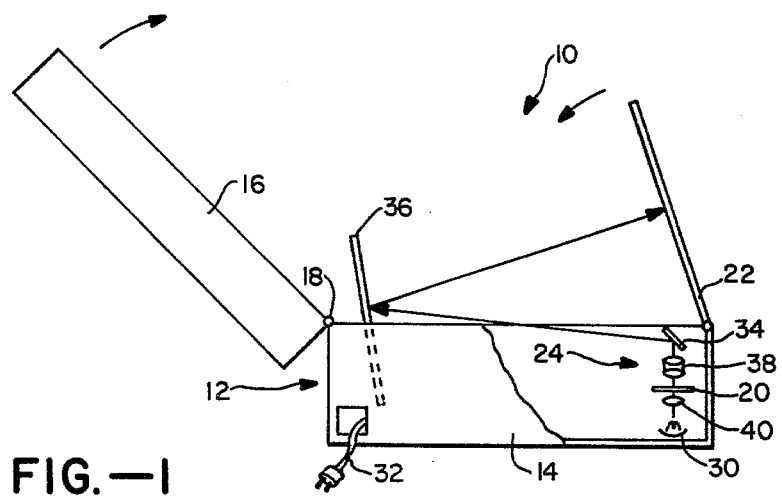
FIG.—1
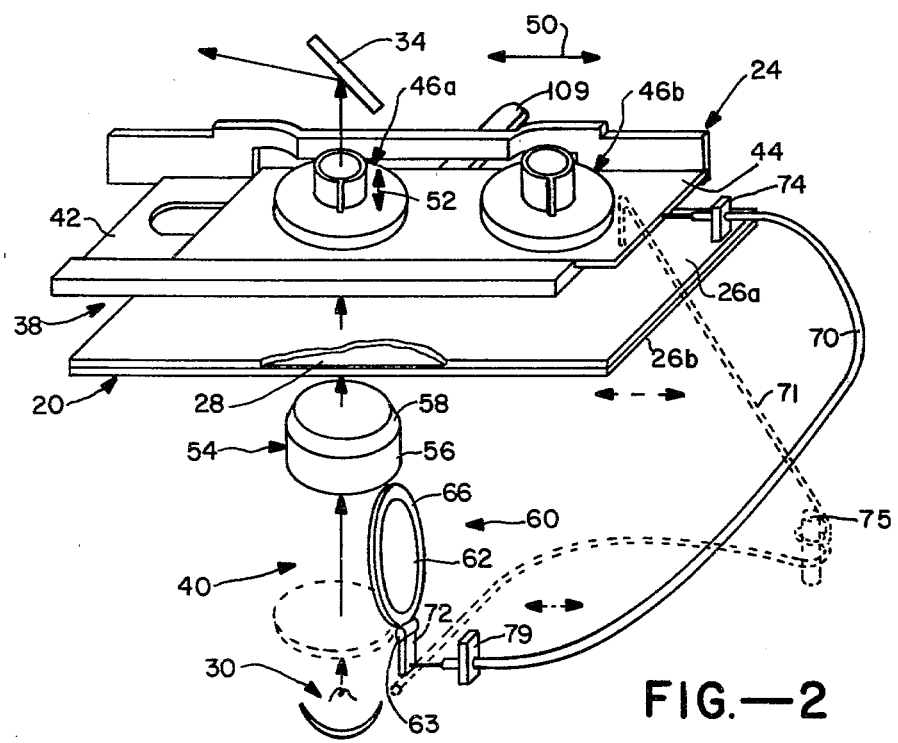
FIG.—2

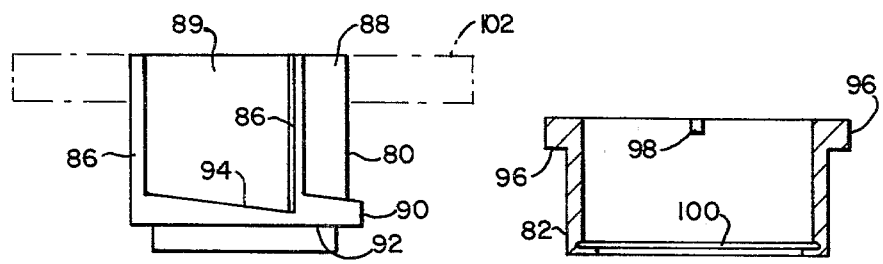
FIG.—3  FIG.—4
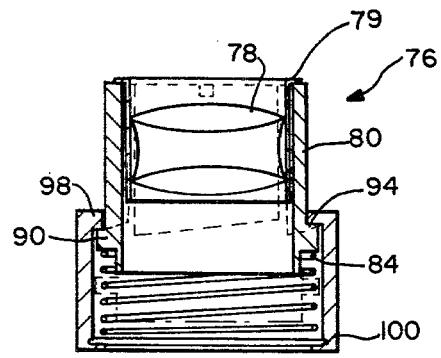
FIG.—5
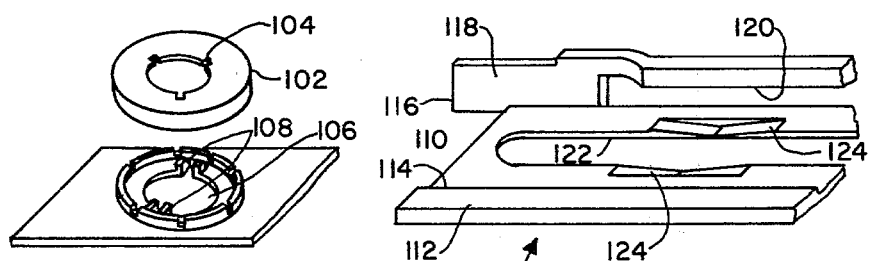
FIG.—6  FIG.—7
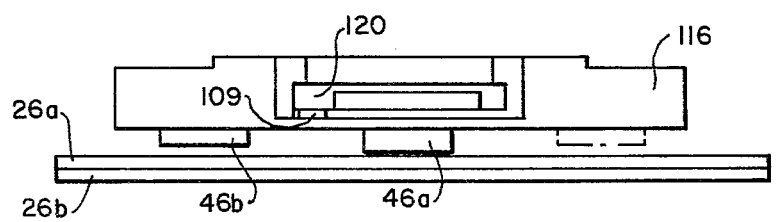
FIG.—8

LENS ARRANGEMENTS FOR MICROFICHE READER ASSEMBLY AND METHOD

The present invention relates generally to a microfiche reader for providing an enlarged image of a microfiche on a projection screen and more particularly to an optical arrangement for use in the reader, especially one which is compatible with a briefcase or a desk-drawer type microfiche reader. A specific desk drawer reader is one disclosed in copending United States patent application Ser. No. 127239, filed Mar. 4, 1980 and entitled A COLLAPSIBLE MICROFICHE READER ASSEMBLY ESPECIALLY SUITABLE FOR USE IN A DESK DRAWER assigned to the assignee of the present application.

A typical microfiche reader of the general type to which the present invention is directed is one which includes a projection screen supported in a fixed position by suitable means, an assembly for supporting a microfiche to be viewed and an optical arrangement for directing a beam of light through the microfiche and onto the screen for projecting an illuminated image of the microfiche thereon. In those cases where the reader is designed to provide only one magnification level of the microfiche image, the optical arrangement may be provided with a single projection lens means and associated condenser lens means. However, in some cases it is desirable to provide the reader with the capability of projecting onto its screen an image of the microfiche at two different magnification levels. In these cases, the optical arrangement utilizes two projection lens means, each requiring a different condenser lens means.

In operating the dual type of arrangement just described, when one projection lens means is optically coupled with the light beam for providing a corresponding image at a particular magnification level, its associated condenser lens means must also be optically coupled with the beam. In the past, this was accomplished by manually moving each of the projection lens means between its optically coupled and uncoupled positions and separately moving the associated condenser lens means between its optically coupled and uncoupled positions. Moreover, each time one of the projection lens means was moved back and forth between its optically coupled and uncoupled positions, it had to be refocused.

As will be seen hereinafter, in accordance with one aspect of the present invention, an optical arrangement is provided and utilizes dual projection and condenser lens assemblies of the general type described. However, unlike the arrangements of the past, this arrangement automatically synchronizes movement of the two assemblies, preferrably mechanically. In accordance with another aspect of the present invention, this movement does not necessitate refocusing of either of its projection lens means after movement of the latter.

Whether or not dual lens assemblies were provided with the optical arrangement just described, where the microfiche reader is of the briefcase or the desk-drawer type, it is important to minimize the space required by its internal components, where possible. As will be seen hereinafter, in accordance with still another aspect of the present invention, the projection lens assembly includes a projection lens contained within a longitudinally collapsible housing. Two such housings and associated lenses are utilized when providing a dual assembly.

One object of the present invention is to provide a microfiche reader having an optical arrangement which utilizes dual projection and condenser lens assemblies but which does not require separate manipulation of each of these assemblies when changing the magnification level of its projected image.

Another object of the present invention is to provide a dual projection lens assembly which utilizes two different projection lenses but which does not require that either of the lenses be refocused as a result of back and forth movement between operative and inoperative positions.

Still another object of the present invention is to contain each of the projection lenses just cited in its own housing and to focus the lens by moving it along an associated focusing path only in response to rotational movement of its housing.

A further object of the present invention is to provide a projection lens assembly which may or may not be of the dual type but which includes a projection lens contained within a collapsible housing especially suitable for use in a briefcase type of microfiche reader.

Still another object of the present invention is to ensure that the unused projection lens of the two projections lenses is raised slightly as it is moved into its storage position so that it does not interfere with the operation of the microfiche carriage.

A further object of the present invention is to provide a design in which the selected projection lens rests, in its support housing on top of the glass cover of the microfiche, providing a so-called floating lens design.

As will be seen hereinafter the microfiche reader disclosed herein is one which includes means for supporting a microfiche in a given area, a projection screen, and an optical arrangement for providing an image of a segment of the microfiche on the screen. This optical arrangement includes a light source for directing a beam of light along a predetermined path through the given area and towards the screen, a projection lens assembly located optically between the given area and screen and a condenser lens assembly located optically between the light source and given area.

In accordance with one aspect of the present invention, the projection lens assembly just recited is a dual assembly including first and second projection lens means and means movable between a first and second position for alternatively optically coupling these first and second means with the light beam. The condenser lens assembly is also a dual assembly including first and second condenser lens means and means movable between a first and second position for differently optically coupling these means with the beam. In addition, the optical arrangement includes means interconnecting these two assemblies so that the first projection and condenser lens means are automatically optically coupled together with the light beam and, alternatively, the second projection and condenser lens means are automatically optically coupled together with the light beam without requiring separate manipulation of the two assemblies. In a preferred embodiment, each of the projection lens means includes at least one projection lens and a housing for containing the latter. This housing includes focusing means for moving its lens back and forth along a fixed focusing path and for maintaining the lens in a selected position on the focusing path whether or not the lens is optically coupled with the light beam.

In accordance with another aspect of the present invention, the projection lens assembly is especially suitable for use in a briefcase or desk-drawer type microfiche reader. This particular assembly includes at least one projection lens and a collapsible housing means for containing the projection lens. This housing means is manually movable between a lengthwise extended position during operation of the microfiche reader and a collapsed position shorter lengthwise than the extended position during inoperation of the reader, specifically during those times when the briefcase or desk-drawer is closed.

FIG. 1 is a side elevational view, partially broken away, of a briefcase type microfiche reader designed in accordance with the present invention.

FIG. 2 is an enlarged perspective view diagrammatically illustrating one part of an optical arrangement which comprises part of the reader of FIG. 1 and which is designed in accordance with a number of aspects of the present invention.

FIG. 3 is a side elevational view of one part of a projection lens housing which in turn comprises part of an overall projection lens assembly utilized in the optical arrangement illustrated in FIG. 2.

FIG. 4 is a longitudinal cross-sectional view of another housing section comprising part of the projection lens assembly just recited.

FIG. 5 is a longitudinal, cross-sectional view of the two housing sections of FIGS. 3 and 4 but assembled together along with a spring member and projection lens contained within the housing sections.

FIG. 6 is a perspective view of another aspect of the projection lens assembly illustrated in FIG. 2.

FIG. 7 is a perspective view of still another aspect of the projection lens assembly illustrated in FIG. 2.

FIG. 8 is a front elevational view of the projection lens assembly in its entirety.

Figure 9:
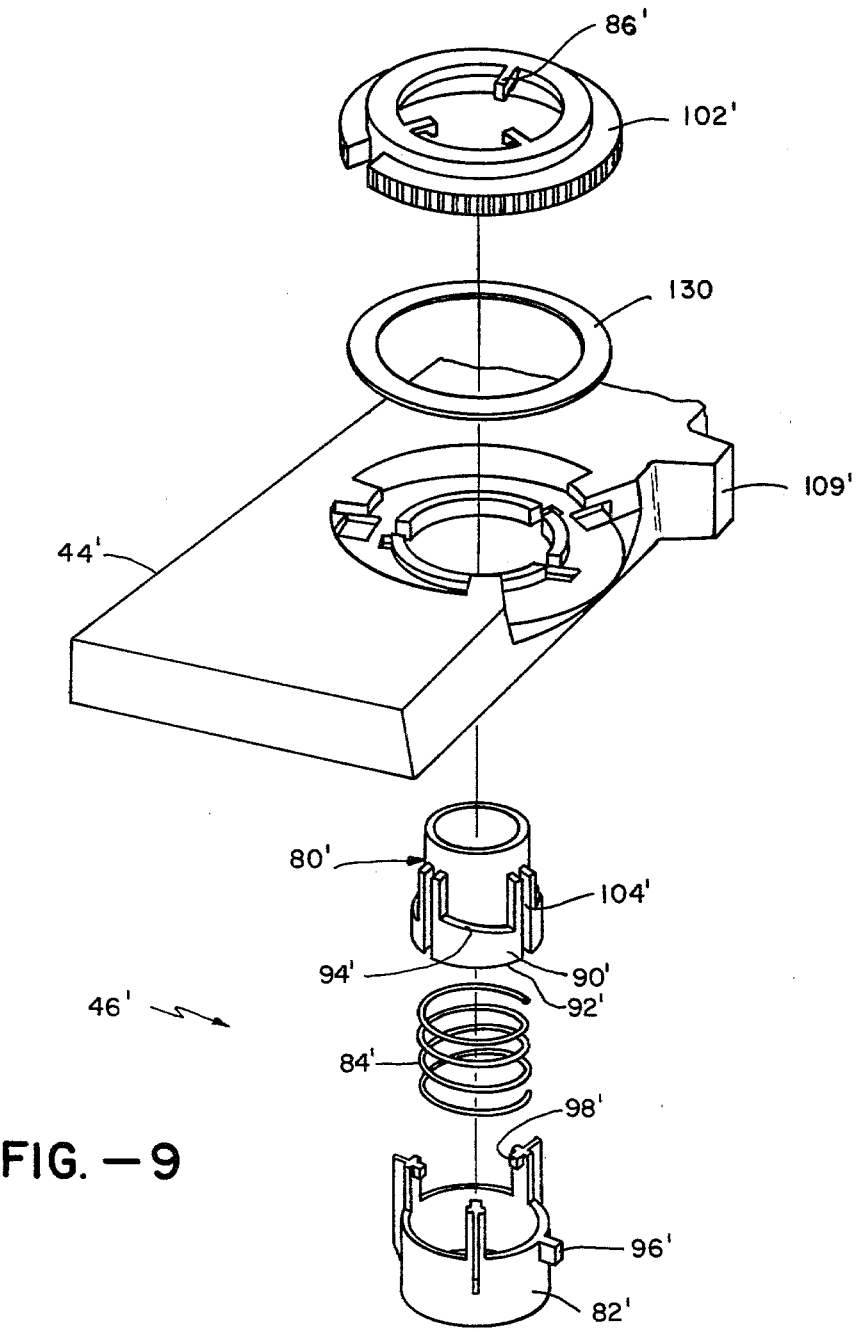
FIG. 9 is an exploded, perspective view of certain components of the optical arrangement of FIG. 2 constructed in accordance with a modified, preferred embodiment of the present invention.

Turning now to the drawings, wherein like components are designated by like reference numerals throughout the various figures, a briefcase type microfiche reader is illustrated in FIG. 1 and generally designated by the reference numeral 10. This microfiche reader utilizes a briefcase type housing 12 having a base section 14 which serves to contain the various components making up the reader and a cover section 16 which is suitably connected to the base section by hinge means 18 for movement between the opened position illustrated and a closed position directly over the base section. The various components contained within this housing include an assembly generally indicated at 20 for supporting a microfiche in a given area, a projection screen 22 and an optical arrangement generally indicated at 24 for providing an image of a segment of a microfiche on screen 22.

As shown in FIG. 1, projection screen 22 is supported in a somewhat vertically extending position by base section 14 when the briefcase housing is opened. This projection screen is hinge mounted within section 14 for pivotal movement between the position shown and a collapsed position when the housing is closed and the reader is not in use. The microfiche support assembly 20, which is also supported on base section 14, is shown only diagrammatically in FIG. 1. This assembly may be of any suitable type capable of containing the microfiche on a fixed plane and supporting it for movement to any point in a given area within that plane. Hence, for purposes of the present invention, it should suffice to say that assembly 20 includes a pair of light transparent plates a top plate 26a and a bottom plate 26b which serve to contain a microfiche 28 therebetween as best seen in FIG. 2.

As stated above, reader 10 includes an optical arrangement 24. This arrangement includes a light source 30 connected to a suitable source of power (not shown) by means of power cord 32 and two mirrors 34 and 36 for directing a beam of light along a predetermined path through the supported microfiche and towards screen 22. The optical arrangement also includes a projector lens assembly generally indicated at 38 in FIG. 1 and a condenser lens assembly generally indicated at 40 in the same figure. The projection lens assembly is located optically between microfiche support assembly 20 and projection screen 22 and physically between the support assembly and mirror 34. The condenser lnns assembly is located optically directly between the microfiche support assembly and light source 30. While each of these assemblies is shown diagrammatically in FIG. 1, a detailed illustration of each is provided in subsequent figures. In this regard, all of the components making up briefcase reader 10 with the exception of these assemblies may be conventional and readily provided by the art. Moreover, while not shown, these conventional components (as well as others which may be provided but not shown) are appropriately mounted within housing 14 by suitable means.

Turning to FIG. 2, the projection lens assembly 38 and condenser lens assembly 40 comprising part of overall optical arrangement 24 are illustrated in more detail. As seen in this figure, the projection lens assembly 38 includes a fixed support 42, a movable support 44 and two projection lens arrangements 46a and 46b. Fixed support 42 is held in place within housing section 14 by suitable means (not shown) directly above and a short distance above top plate 26a of microfiche support assembly. Movable support 44 is maintained on and movable along support 42 between the position shown in FIG. 2 and a further position to the left as indicated by the two headed arrow 50. Two projection lens arrangements 46a and 46b are carried by movable support 44 such that arrangement 46a is optically coupled with the light beam when the movable support is in the position illustrated in FIG. 2 and so that arrangement 46b is alternatively optically coupled with the light beam when support 44 is moved to its alternate position. In this regard, each of the projection lens arrangements is maintained above and spaced from top plate 26a until it moves into position optically with the light beam. At that time, the arrangement falls down and rests or "floats" on the top plate, as indicated by arrow 52. A detailed description of exactly how this is carried out along with the detailed description of other aspects of the overall projection lens assembly will follow.

As stated previously, condenser lens assembly 40 is posioptically between microfiche support assembly 20 and light source 30. As illustrated in FIG. 2, this assembly includes a main condenser lens arrangement 54 fixedly located by suitable means (not shown) directly under and spaced a short distance from bottom plate 26b of microfiche support assembly 20. This arrangement includes a fixed housing 56 which contains at least one condenser lens 58 located across and optically coupled with the light beam from source 30. The overall condenser lens assembly also includes an auxiliary condenser lens arrangement 60 which is located just below arrangement 54 and which is comprised of an auxiliary condenser lens 62 carried on a support frame 66. Support frame 66 is in turn mounted by means of pivots 68 for movement between a vertically extending position (shown by solid lines in FIG. 2) and the horizontally extending position shown by dotted lines. With frame 66 in its vertical solid line position, the auxiliary lens is out of the light beam path and with the frame in its horizontal position, the auxiliary lens extends across and is optically coupled with the light beam and cooperates with lens 58 to provide a second condenser beam which is different optically than that provided by lens 58 alone.

In accordance with one aspect of the present invention, the two assemblies just described are interconnected to one another so that when the projection lens arrangement 46a is optically coupled with the light beam, main condenser lens arrangement 54 and only this arrangement is optically coupled with the light beam. When projection lens arrangement 46b is optically coupled with the light beam, auxiliary condenser lens 62 is automatically moved from its uncoupled position to its coupled position. This auxiliary lens compensates for the difference in optical effect between projection lens arrangement 46a and arrangement 46b. In one embodiment, the two assemblies are mechanically interconnected for automatic synchronized back and forth movement by means of a flexible pull cable 70 connected at one end to movable support 44 and at its other end to a projecting end 72 comprising part of frame 66. The cable is held in place by suitable supports 74.

In a further and preferred embodiment of this method of physically correcting the movable support 44 to the auxiliary condenser lens 66, a long steel wire 71 (shown by dotted lines in FIG. 2) is attached to parts 44 and 66 in such a way that the back and forth motion of movable support 44, as indicated by the dotted two-way arrow, is transmitted through the spring action of wire 71 to the auxiliary condenser lens housing 66, as indicated by the second dotted two-way arrow. This is best seen in the dotted lines of FIG. 2, where the steel wire is shown bent to loop and pivot around a fixed bearing 75 so as to achieve the desired result. Bearing 75 is fixedly mounted to the assembly housing (not shown).

Having described overall optical arrangement 24 generally and its condenser lens assembly 40 and cable 70 and wire 71 in particular, attention is now directed to a detailed discussion of projection lens assembly 38. In this regard, attention is specifically directed to one of the projection lens arrangements, for example, arrangement 46a which is illustrated in FIGS. 3, 4 and 5. As seen in these figures, arrangement 46a includes an overall housing 76 for containing a projection lens 78 which, in actual practice, is made up of multiple lenses of known configuration as contained with its own housing 79. Housing 76 is itself comprised of two sections, a generally cylindrical inner section 80 which carries projection lens 78 and a generally cylindrical outer section 82 which contains an internal biasing spring 84 for purposes to be described hereinafter. As specifically illustrated in FIG. 3, inner section 80 includes three equally circumferentially spaced splines 86 extending vertically downward from top edge 88 and outward from the outer surface 89 of the housing section. A continuous annual shoulder 90 extends around outer surface 89 at the bottom of splines 86 and includes a downwardly facing planar shoulder 92 which is also annular in configuration and three distinct but identical upwardly facing ramped surfaces 94 extending between adjacent splines.

Having described inner housing section 80 structurally, attention is now directed to outer housing section 82 which is seen by itself in FIG. 4. This housing section includes two or three guide ribs 96 projecting out from the outer cylindrical surface of section 80 on opposite sides thereof. Three equally circumferentially fixed stops 98 project inward from the inner surface of housing section 82, also at the top end thereof. Only one of these stops is shown. An annular shelf or shoulder 100 is provided in the same inner surface at the lower end of the housing section.

The two housing sections just described along with spring 84 are shown assembled together in FIG. 5. As seen in this figure, inner section 80 fits telescopically within outer section 82 with spring 84 being disposed concentrically therebetween. In this regard, planar surface 92 comprising the underside of shoulder 90 serves to retain the top end of the biasing spring while annular shelf or shoulder 100 serves to retain the bottom end of the spring. The spring itself serves to bias inner section 80 in the vertically upward position illustrated in FIG. 5. However, because of the spring, section 80 is easily manually movable downward into the dotted line position in outer section 82 for reducing the overall longitudinal extent of the projection lens arrangement. This collapsible feature is especially suitable where the projection lens arrangement is used in a briefcase or desk-drawer type reader where space is at a premium.

With inner housing section 80 in its extended position, it can be seen from FIG. 5 that each of the three ramped surfaces 94 press against a corresponding stop 98. In this way, rotation of inner housing 80 about its own axis causes each of the stops 98 to ride on its engaging ramped surface. This rotational movement is limited to 120° or actually a little less by the interaction of splines 80 with stops 98. More specifically, as the inner housing is rotated, each stop 98 moves across an associated ramped surface 94 until it reaches an adjacent spline which prevents further movement. However, during this rotational movement of the inner housing section, engagement of each of the fixed stops against its associated ramped surface causes the entire inner housing section to move vertically upward or downward, depending upon the direction of rotation of the housing section. This causes the projection lens 78 to move along what may be referred to as a focusing path coincident with the axis of rotation at the housing section and serves to focus the projection lens by selecting the appropriate point along that path. In this regard, it is important to note that once inner housing section 80 is rotated to a selected point along the focusing path it will remain in that position unless the housing section is again rotated. This is true regardless of movement of the overall projection lens arrangements between their optically coupled and uncoupled positions. In order to readily provide this rotational movement, an annular focusing knob 102 is disposed around the top end of linear housing section 80. Splines 86 cooperate with appropriately positioned slots 104 extending into the knob from its inner diameter (see FIG. 6) to interlock the knob to the inner housing section.

While projection lens arrangement 46a has been described in detail, it is to be understood that arrangement 46b would be identical except, of course, that their respective lenses would be different from an optical standpoint. As stated previously, each of these arrangements is carried by movable support 44. In order to do this, the movable support includes two through holes 106, one of which is illustrated in FIG. 6. Each of these through holes is diametrically slightly larger than the outer diameter of its associated outer housing section 82 so that the latter is slidably received therein. However, each through hole includes diametrically opposite slots 108 which are positioned to receive previously described guide ribs 96 therein. In an alternative and preferred design, three guide ribs 96 are positioned within three slots 108. In this case the three ribs 96 and the three slots 108 are located 120° apart. These ribs serve to prevent the outer housing section from rotating during rotation of its associated inner housing section 80. However, they also serve to raise the entire projection lens arrangement away from the microfiche support 20 when the arrangement is moved out of the light beam path, as will be seen hereinafter. It can be seen that the entire focusing assembly 76 is free to ride up and down a short distance relative to plate 44, thus allowing the properly focussed projection lens to float on top of the glass plate 26a which covers the microfiche.

Turning now to FIG. 7, attention is directed to fixed support 42. As seen in this figure, support 42 includes a main planar body 110 which extends directly above and is parallel with the two plates 26a and 26b. A rearwardmost shoulder 112 extends the length of main body 110 along its backside forming one shoulder guide 114 for movable plate 44. A front, significantly higher shoulder 116 and an opposite guide 118 is provided across the front side of main body 110 and extends the length thereof. This shoulder also includes a longitudinally extending through slot 120 for reasons to be discussed below. An additional through slot 122 is provided longitudinally across main body 110 between guide surfaces 114 and 118. As will be seen hereinafter, this latter slot serves to slidably receive the outer housing section of each of the projection lens arrangements and hence is slightly wider than the width of each section. As will also be seen, the top surface of main body 110 includes two V-shaped ramps 124 located on opposite sides of through slot 122 concentrically between its ends.

Having described fixed support 20, attention is now directed to the way in which the movable support 44 and projection lens arrangements 46a and 46b are supported for movement along support 42. As seen best in FIG. 2, the movable support fits directly over and slidably against the top surface of the main body 110 between and in slidably engagement with the guide surfaces 114 and 118 (FIG. 7). At the same time, the outer housing sections of the two projection lens arrangements fit within slot 122 and an arm 109 comprising part of the movable support extends through slot 120 where it can be manually manipulated by the operator. It should be noted that the previously described guide flanges 96 which fit within previously described slots 108 also rest against the top surface of main body 110 on opposite sides of through slot 122. Hence, as movable support 44 moves along the top surface of main body 110, the two guide flanges are caused to do the same. As the given projection lens arrangement moves into optical position with the light beam, the associated guide flanges move across the V-shaped ramps 124 to the lowermost points thereof. This is caused solely by the weight of the arrangement itself, thereby causing the arrangement to move from an upper position to a lowermost position shown in FIG. 8. With the arrangement in the lowermost position, it rests directly against the top surface of glass plate 26a thus causing the projection lens to float on top of the plate 26a in a so-called "floating lens" mode. When the optically coupled arrangement is moved out of this position, its associated guide flanges move up the ramped surfaces causing the arrangement to go back to its uppermost position.

Having described optical arrangement 24 including its various components and particularly projection lens assembly 38 and condenser lens assembly 40, it should be apparent that the arrangement includes a number of advantage aspects, all of which have been discussed previously. However, in summarizing these aspects, it can be seen that arrangement 24 in its preferred embodiment includes dual projection and condenser lens assemblies which are innerconnected with one another for automatic synchronized movement, preferably by means of mechanical innerconnection and most preferably by a flexible steel wire. The projection lens assembly itself is one which supports two projection lens arrangements, each including a housing and lens, which are moved between two positions so as to be alternately coupled with the beam provided by light source 30. In this regard, each movable arrangement automatically moves onto the microfiche support 20 when moved into optical alignment with the light beam and automatically moves out of engagement with the support when the arrangement moves out of optical position. Further, each of the projection lens arrangements can be properly focused by rotational movement of one of its housing sections and once focused remains in that position regardless of movement into and out of the light beam unless rotated again. Further, each projection lens arrangement is collapsible so as to reduce the amount of space it requires when the reader is not being used. This latter feature is especially suitable for use in a briefcase or desk-drawer type reader.

Referring now to FIG. 9, attention is directed to a preferred movable support 44' and one of two projection lens arrangements 46'. A second lens arrangement (not shown) would be identical with arrangement 46', except for the lens itself. Both lens arrangements 46' and the one not shown and movable support 44' function in the same way as their previously described, corresponding components 46a, 46b and 44. Therefore, like components (functionally) are designated by like reference numerals with the corresponding components illustrated in FIG. 9 being primed.

Inasmuch as the two embodiments just recited function in the same way and are cross referenced by like reference numerals, a description of the embodiment of FIG. 9 will not be provided. It should be pointed out that the outer focusing knob 102' has spines 86' rather than slots and inner housing section 80' includes slots 104'. Also, the shapes of the various components are slightly different and the embodiment shown in FIG. 9 uses a tension washer 130 adapted for positioning between knob 102' and support 44'.

What is claimed is:

1. In a microfiche reader including means for supporting a microfiche in a given area and a projection screen, said microfiche supporting means including upper and lower confronting horizontal support plates for containing a microfiche therebetween, an optical arrangement for providing an image of a segment of said microfiche on said screen, said arrangement comprising:

(a) means including a light source for directing a beam of light along a predetermined path through said given area and towards said screen;

(b) a condenser lens assembly including first and second condenser lens means and means movable between a first and second position for alternatively optically coupling said first and second lens means with said beam at a location optically between said light source and said given area;

(c) a projection lens assembly including first and second projection lens means and means movable between a first and second position for alternatively optically coupling said first and second projection lens means with said beam at a location optically between said given area and said screen, said movable optical coupling means of said projection lens assembly including means for supporting said first and second projection lens means such that each of the latter when optically coupled with said beam rests on the top surface of said upper plate and is free to move vertically to a limited extent such that the upper plate if moved within said given area slides under the optically coupled projection lens means with the latter in continuous contact therewith; and (d) means interconnecting the movable optical coupling means of said projection lens assembly with the movable optical coupling means of said condenser lens assembly for automatically moving the latter optical coupling means between its first and second position in response to the movement of the former optical coupling means between its first and second position, whereby said first projection and condenser lens means are optically coupled together with said beam and, alternatively, said second projection and condenser lens means are optically coupled together with said beam, said interconnecting means including a rigid wire having opposite transversely extending end sections one of which is fixedly attached at its end to the movable optical coupling means of the projection lens assembly and the opposite one of which is fixedly attached at its end to the movable optical coupling means of the condenser lens assembly, said wire including an intermediate section, said interconnecting means including means for supporting said intermediate section for pivotal movement.

2. An arrangement according to claim 1 wherein said first condenser lens means includes at least one condenser lens and said second condenser lens means includes said one condenser lens and a second auxiliary condenser lens which forms no part of said first condenser lens means.

3. An arrangement according to claim 2 wherein said first and second projection lens means include projection lenses which are entirely distinct from one another.

4. An arrangement according to claim 1 wherein each of said first and second projection lens means includes at least one projection lens and collapsable housing means for containing said projection lens, said housing means being movable between a lengthwise extended position during and for operation of the microfiche reader and a collapsed position shorter lengthwise than said extended position during inoperation of the reader.

5. An arrangement according to claim 1 wherein each of said first and second projection lens means includes at least one projection lens and a housing for containing said projection lens, said housing including focusing means for moving said lens back and forth along a fixed focusing path and for maintaining said lens in any selected position on said focusing path whether or not the lens is optically coupled with said beam.

6. An arrangement according to claim 5 wherein each of said focusing means is designed such that rotation of said housing about an axis coincident with said focusing path causes said lens to move along said focusing path.

7. An arrangement according to claim 1 wherein said supporting means supports said first and second projection lens means such that each of the latter when not optically coupled with said beam rests above and spaced from said upper plate.

8. An arrangement according to claim 1 wherein said supporting means includes an elongated pin and wherein said intermediate section is a wound section disposed for movement around said pin.

9. An arrangement according to claim 1 wherein said means for alternatively optically coupling said first and second projection lens means with said beam includes means for moving said first and second projection lens means along a straight-line path between respective positions optically in line and optically out of line with said beam.

10. An arrangement according to claim 1 wherein said projection lens assembly includes handle means for manually moving said movable means between said first and second position and wherein said interconnecting means includes wire means connected at one end with the movable means of said projection lens assembly and at an opposite end with the movable means of said condenser lens assembly whereby manual movement of the movable means forming part of said projection lens assembly between its first and second position using said handle means automatically causes the movable means of said condenser lens assembly to move between its first and second position.

11. In a briefcase microfiche reader including means for supporting a microfiche in a given area, a projection screen, a reader base section having a chamber for containing said supporting means and screen during inoperation of said reader and a cover section mounted to said base section for movement between a first position for closing said chamber during inoperation of said reader and a second position for opening said chamber during operation of said reader, an optical arrangement also contained within said chamber for providing an image of a segment of said microfiche on said screen, said arrangement comprising:

(a) means including a light source for directing a beam of light along a predetermined path through said given area and towards said screen;

(b) a condenser lens assembly including
  (i) a main condenser lens fixedly located on said beam path between said light source and given area for optically coupling the lens with said beam,
  (ii) an auxiliary condenser lens, and
  (iii) means supporting said auxiliary lens for movement between a first position in optical alignment with said main lens and a second position out of optical alignment therewith;

(c) first and second projection lens assemblies, each of which includes
  (i) at least one projection lens,
  (ii) collapsible housing means for containing said projection lens, said housing means being manually movable between a lengthwise extended biased position during operation of the microfiche reader when said cover section is open and a manually forced collapsed position shorter lengthwise than said extended position during inoperation of the reader when said cover section is closed, and (iii) focusing means cooperating with said housing means for moving said projection lens back and forth along a fixed focusing path in response to the rotation of a section of said housing means and for maintaining said projection lens in any selected position in said focusing path;

(d) means for supporting each of said projection lens assemblies alternatively for movement into and out of said beam path at a location optically between said given area and said screen for alternatively optically coupling the projection lenses of said assemblies with said light beam, each of said projection lens assemblies being moved into and out of said path without affecting the position of its projection lens on its focusing path; and (e) means mechanically interconnecting said last-named supporting means with said auxiliary condenser lens supporting means for automatically moving said auxiliary condenser lens between said optically aligned first position and non-aligned second position in response to the alternative movement of said first and second projection lens assemblies into said beam path.

* * * * *